US011745134B2

(12) United States Patent
Hermans

(10) Patent No.: US 11,745,134 B2
(45) Date of Patent: Sep. 5, 2023

(54) DEVICE AND METHOD FOR DRYING COMPRESSED GAS AND A COMPRESSOR INSTALLATION PROVIDED WITH SUCH DEVICE

(71) Applicant: ATLAS COPCO AIRPOWER, NAAMLOZE VENNOOTSCHAP, Wilrijk (BE)

(72) Inventor: Hans Maria Karel Hermans, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 0 days.

(21) Appl. No.: 18/017,522

(22) PCT Filed: Sep. 28, 2021

(86) PCT No.: PCT/IB2021/058822
§ 371 (c)(1),
(2) Date: Jan. 23, 2023

(87) PCT Pub. No.: WO2022/074507
PCT Pub. Date: Apr. 14, 2022

(65) Prior Publication Data
US 2023/0211279 A1    Jul. 6, 2023

(30) Foreign Application Priority Data
Oct. 9, 2020    (BE) .................................. 2020/5702

(51) Int. Cl.
*B01D 53/04*    (2006.01)
*B01D 53/26*    (2006.01)

(52) U.S. Cl.
CPC ..... *B01D 53/0446* (2013.01); *B01D 53/0438* (2013.01); *B01D 53/261* (2013.01);
(Continued)

(58) Field of Classification Search
CPC ........................ B01D 53/04; B01D 53/0446; B01D 53/0438; B01D 53/0462; B01D 53/261;
(Continued)

(56) References Cited

U.S. PATENT DOCUMENTS 2,440,326 A * 4/1948 Cadman ................ B60T 17/004
96/124
3,206,918 A * 9/1965 Robinson ............... B01D 53/26
96/127
(Continued)

FOREIGN PATENT DOCUMENTS

CN    107854976 B    3/2018
EP    1010452 A1    6/2000
(Continued)

OTHER PUBLICATIONS

International Search Report in corresponding PCT Application No. PCT/IB2021/058822, dated Dec. 21, 2021.
(Continued)

*Primary Examiner* — Frank M Lawrence, Jr.
(74) *Attorney, Agent, or Firm* — Bacon & Thomas, PLLC

(57) ABSTRACT

A device for drying compressed gas, having an inlet for compressed gas to be dried and an outlet for dried compressed gas. The device includes at least two vessels, a regenerable drying agent and a controllable valve system. By controlling the valve system, the vessels are each in turn successively regenerated. The device is provided with a regeneration conduit splitting off a portion of the dried compressed gas as a regeneration gas and feeding it into the at least one vessel that is being regenerated. The regeneration conduit at least partly extends through an opening in the vessels such that the regeneration gas can be split off from the vessel that dries the compressed gas. A heater is provided in the regeneration conduit for heating the regeneration gas
(Continued)

before the regeneration gas is fed through the drying agent into the vessel that is being regenerated.

16 Claims, 2 Drawing Sheets

(52) U.S. Cl.
CPC .. *B01D 2253/104* (2013.01); *B01D 2253/106* (2013.01); *B01D 2253/116* (2013.01); *B01D 2257/80* (2013.01); *B01D 2259/402* (2013.01); *B01D 2259/40003* (2013.01); *B01D 2259/404* (2013.01); *B01D 2259/4009* (2013.01)

(58) Field of Classification Search
CPC ........ B01D 2253/104; B01D 2253/106; B01D 2253/116; B01D 2257/80; B01D 2259/40003; B01D 2259/4009; B01D 2259/402; B01D 2259/404
USPC ......... 95/114, 115, 117, 121, 123, 125, 126; 96/121, 126–128, 146; 34/80, 472, 473
See application file for complete search history.

(56) References Cited

U.S. PATENT DOCUMENTS

| | | | | |
|---|---|---|---|---|
| 4,008,058 A | * | 2/1977 | Wischer ............... | B01D 53/261 |
| | | | | 96/126 |
| 4,322,223 A | * | 3/1982 | Christel, Jr. ......... | B01D 53/261 |
| | | | | 95/122 |
| 5,213,593 A | * | 5/1993 | White, Jr. .......... | B01D 53/0462 |
| | | | | 95/99 |
| 5,580,903 A | * | 12/1996 | Mawatari ............. | A61K 31/198 |
| | | | | 514/561 |
| 7,942,011 B2 | * | 5/2011 | Forkosh ............... | B01D 53/261 |
| | | | | 62/271 |

FOREIGN PATENT DOCUMENTS

| | | |
|---|---|---|
| EP | 1809406 A1 | 7/2007 |
| EP | 2205340 A1 | 7/2010 |
| WO | 2011050423 A2 | 5/2011 |

OTHER PUBLICATIONS

BE Search Report in corresponding BE Application No. 202005702, dated May 28, 2021.
International Preliminary Examining Authority in corresponding PCT Application No. PCT/IB2021/058822, dated Oct. 11, 2022.

* cited by examiner

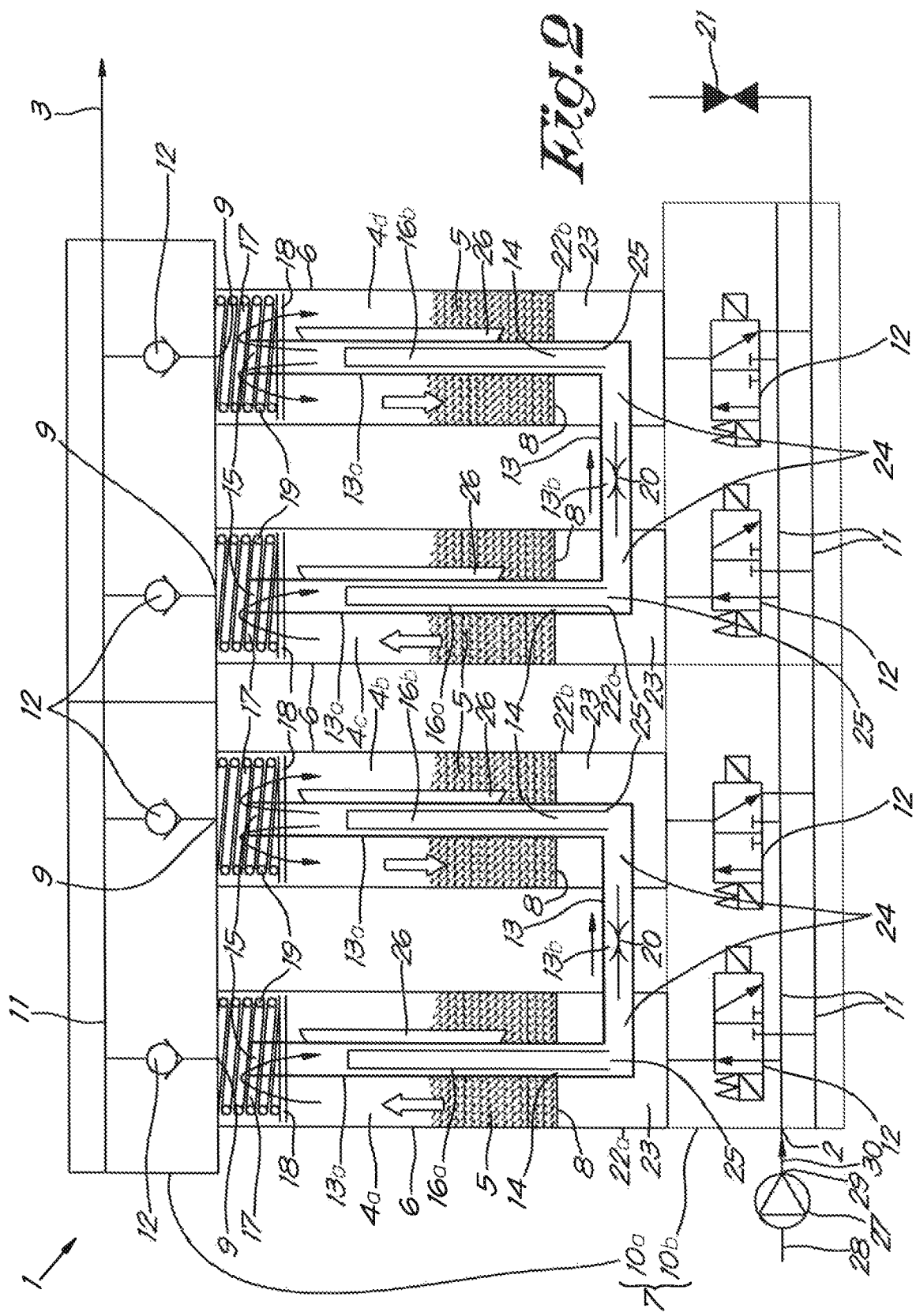

DEVICE AND METHOD FOR DRYING COMPRESSED GAS AND A COMPRESSOR INSTALLATION PROVIDED WITH SUCH DEVICE

The present invention relates to a device for drying compressed gas.

More specifically, the invention is intended for drying compressed gas originating from a compressor.

BACKGROUND OF THE INVENTION

Such devices, also called dryers, are known which comprise two or more separate vessels each of which comprises a quantity of regenerable drying agent or desiccant, wherein the vessels each alternately and in turn are in operation in order to dry compressed gas, by directing the compressed gas to be dried through it and to be regenerated, wherein the drying agent is regenerated by bringing it into contact with a hot gas, also called regeneration gas.

By regeneration here is meant the process in which a moisture-saturated or nearly saturated drying agent is stripped of the absorbed material or adsorbed moisture by contacting it with a regeneration gas that will drain the moisture from the drying agent. The drying agent will then be able to be reused for drying.

By means of an appropriate system of conduits and valves it is possible to switch between the two vessels.

Devices are already known in which a portion of the gas compressed gas to be dried is branched off through a regeneration conduit and used as regeneration gas. An example is shown in EP 2,205,304.

Devices are already known in which a portion of the dried, compressed gas is branched off through a regeneration conduit and used as regeneration gas.

A heater is often placed in this regeneration conduit to heat up the regeneration gas.

Although by heating of the regeneration gas, less regeneration gas is required and hence there is less loss of dried, compressed gas, such an arrangement presents a number of disadvantages.

Firstly, the heater will not only heat up the regeneration gas, but through losses also the ambient air and thus indirectly also the vessels, which is of course undesirable for those vessels that are not regenerating.

Due to said losses, the heater must also operate at a higher temperature in order to obtain a sufficiently high temperature of the regeneration gas or more regeneration gas will have to be branched off to ensure that the drying agent can be sufficiently regenerated in an acceptable time period.

A further additional disadvantage is that the hot gas, after being heated by the heater in the regeneration conduit, still has to pass through valves or ventils before it ends up in the vessel that is being regenerated.

As a result, these valves must be special heat-resistant valves.

EP 1,010,452 describes a Device for drying compressed gas, having an inlet for compressed gas to be dried and an outlet for dried compressed gas.

SUMMARY OF THE INVENTION

The present invention aims to provide a solution to at least one of the aforementioned and other drawbacks.

The object of the present invention is a device for drying compressed gas, having an inlet for compressed gas to be dried and an outlet for dried compressed gas, which device comprises at least two vessels filled with a regenerable drying agent and a controllable valve system connecting said inlet and outlet to an inlet and outlet of said vessels, wherein said valve system is such that always at least one vessel is being regenerated while the other vessels dry the compressed gas, wherein by controlling the valve system, the vessels are each in turn successively regenerated, wherein the device is provided with a regeneration conduit splitting off a portion of the dried compressed gas as a regeneration gas and feeding it to the at least one vessel that is being regenerated, for the regeneration of said at least one vessel that is being regenerated, characterized in that the regeneration conduit at least partly extends through an opening provided thereto in the vessels for regeneration gas into the vessels such that the regeneration gas can be split off from the vessel that dries the compressed gas, and in that in the vessels, a heater is provided situated in the regeneration conduit for heating the regeneration gas before the regeneration gas is fed through the drying agent into the vessel that is being regenerated.

Thus, the regeneration gas is branched off in the relevant vessel itself, i.e. brought from the interior of the vessel and through the regeneration conduit to the vessel that is being regenerated.

Because the vessels will each in turn dry and be regenerated, the regeneration conduit will extend at least partially into each vessel to allow regeneration gas in each vessel to be branched off.

An advantage is that the heat losses of said heater will end up in the vessel that regenerates, i.e. exactly at the location where this heat is desired and useful.

The heat that is normally lost with a heater located outside the vessel will now additionally heat up the drying agent and the regeneration gas contained in the respective vessel.

As a result, the temperature of the heater can be set to a lower value and/or less regeneration gas is required.

It is important to note that only the heater in the vessel that is being regenerated will be switched on.

In the vessels that dry compressed gas or that are cooled, the heater will be switched off.

Another advantage is that the heated gas immediately enters the vessel, without having to pass through valves or ventils. Therefore, no special heat-resistant valves need to be provided.

In the most preferred embodiment, an intermediate block is arranged between each vessel and the valve system, with a passage for gas to be dried which connects to the inlet of the respective vessel and to the valve block and a passage for regeneration gas which connects to said opening for regeneration gas in the vessels, which passage for regeneration gas forms part of the regeneration conduit.

The gas to be dried enters the vessel on the same side as where the regeneration gas enters or exits the vessel, such that the section of the regeneration conduit extending into the vessel is designed as a long section to ensure that the gas to be dried has passed through the drying agent and is thus dried before it is branched off through the regeneration conduit.

As a result, there will be sufficient space in said section of the regeneration conduit to accommodate the heater.

It is important to note that the geometry, location and design of the inlet for gas to be dried and the passage for regeneration gas in the vessel, and thus also the geometry, location and design of the passage for gas to be dried and the passage for regeneration gas of the intermediate block can be suitably selected.

In a practical embodiment, in the vessels at one of their ends, an empty space is provided which is free of drying agent, wherein the open end of the regeneration conduit is situated in this empty space.

This will ensure that regeneration gas can be branched off efficiently and smoothly and that the open end of the regeneration conduit is not blocked or clogged with drying agent.

In addition, this will also ensure that the regeneration gas that ends up in the vessel that is being regenerated can be properly distributed over the drying agent.

The invention also relates to a compressor installation provided with a compressor having an inlet for gas to be compressed and an outlet with a pressure conduit for compressed gas, characterized in that the compressor installation is provided with a device according to the invention for drying the flow of compressed gas supplied by the compressor which is passed through the device for supplying dried gas to a consumer network through the outlet of the device, the pressure conduit thereto connecting to the inlet of the device.

Such a compressor installation will have the corresponding advantages of a device according to the invention.

The invention also relates to a method for drying compressed gas using a device according to the invention, wherein the method comprises the step of passing compressed gas to be dried through a vessel and regenerating the other vessel, wherein the method consists of each in turn successively regenerating the vessels, wherein the method comprises the step of splitting off a portion of the dried compressed gas, directing this split-off gas to the vessel that is being regenerated, characterized in that the method comprises the step of splitting off the dried compressed gas in the vessel drying itself, and the step of heating this gas in the vessel regenerating itself using a heater arranged in the vessel.

Preferably, the method includes the step of cooling the vessels before or after they are being regenerated, wherein each vessel successively either:

dries, is regenerated and is cooled; or dries, is cooled and is regenerated;

and wherein the method is such that always one vessel dries the compressed gas.

The advantages of such a method are similar to those of a device according to the invention.

BRIEF DESCRIPTION OF THE DRAWINGS

With the aim to better show the characteristics of the invention, hereinafter, as an example without any limitative character, several preferred embodiments are described of a device and method according to the invention for drying compressed gas and compressor installation provided with such a device, with reference to the accompanying drawings, in which:

FIG. 2 shows a variant of FIG. 1.

DETAILED DESCRIPTION OF THE INVENTION

Figure 1:
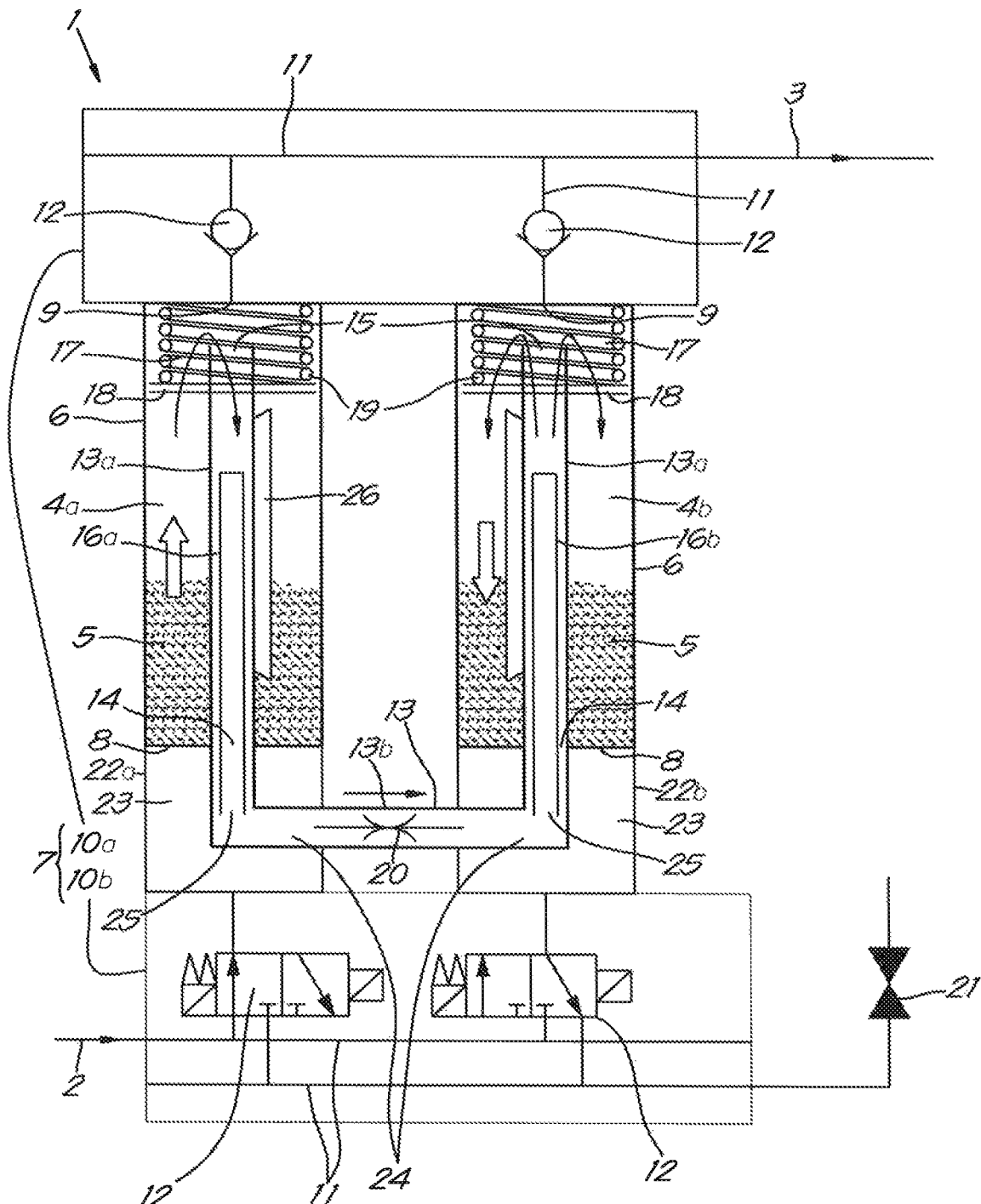
FIG. 1 shows schematically a device according to the invention.

The device 1 according to the invention shown in FIG. 1 comprises an inlet 2 for compressed gas to be dried, which originates, for example, from a compressor, and an outlet 3 for dried compressed gas.

In this case, the device 1 comprises two vessels 4a, 4b, which contain a regenerable drying agent 5. In this case, the regenerable drying agent 5 is granular.

The regenerable drying agent 5 may take the form of granules of silica gel.

Another possibility is activated alumina ('activated alumina') or molecular sieve material ('molecular sieve').

It is also possible for the drying agent to be in a solid form, comprising a solid support of ceramic material, of paper, of glass fibre or of wire mesh.

A combination of all the above is also possible.

It is not excluded for the invention that there are more than two vessels 4a, 4b.

The vessels 4a, 4b are preferably manufactured from extruded profiles.

In this case, but not necessarily for the invention, the vessels 4a, 4b are coated all round on their outside with an insulating material 6.

It is additionally or alternatively also possible for the vessels 4a, 4b to be coated all around on their inside with an insulating material 6.

It is also possible that the vessels 4a, 4b are double-walled, wherein insulating material is arranged between the double wall of a vessel 4a, 4b and/or that the vessels 4a, 4b are coated on their outside and/or inside with an insulation coating.

Also a combination of two or more of said insulation options is not excluded.

The device 1 further comprises a controllable valve system 7. The controllable valve system 7 provides the connection, on the one hand, between said inlet 2 and outlet 3 of the device 1, and, on the other hand, with an inlet 8 and an outlet 9 of the vessels 4a, 4b.

In this example, the controllable valve system 7 is embodied in the form of two valve blocks 10a, 10b which are connected to the vessels 4a, 4b, each consisting of a network of pipes 11 with valves 12 or shut-off valves.

In this case, there are two valve blocks 10a, 10b, which are connected at the opposite ends of the vessel 4a, 4b, in which the inlet 8 and output 9 of the vessels 4a, 4b are located.

Said valve system 7 is such that always at least one vessel 4a is being regenerated, while the other vessel 4b dries the compressed gas, whereby by controlling the valve system 7 the vessels 4a, 4b are each in turn successively regenerated.

This is done, for example, by appropriate switching of the valves 12 in the valve blocks 10a, 10b. This is made possible in the example shown because the valves 12 are switchable between two different positions. To this end, the device 1 is provided with a control unit, not shown in the figures.

In the example shown, insulating material 6 is also provided between the vessels 4a, 4b and the valve system 7.

Furthermore, the device 1 is provided with a regeneration conduit 13, which splits off a portion of the dried compressed gas as a regeneration gas and feeds it into the at least one vessel 4b, that is being regenerated, for the regeneration of said at least one vessel 4b, that is being regenerated.

According to the invention, the regeneration conduit 13 extends at least partly through an opening 14 in the vessels 4a, 4b for regeneration gas, provided thereto, into the vessels 4a, 4b.

In other words, the open end 15 of the regeneration conduit 13 is situated in the interior of the vessels 4a, 4b.

In this way, the regeneration gas will be split off from the vessel 4a drying compressed gas.

The open end 15 of the regeneration conduit 13 is situated near the outlet 9 of the vessels 4a, 4b.

Furthermore, in both vessels a heater 16a, 16b is provided which is situated in the regeneration conduit 13 for heating the regeneration gas before the regeneration gas is directed through the drying agent 5 in the vessel 4b, that is being regenerated.

In the vessels 4a, 4b an empty space 17 is provided at one of their ends, which is free from drying agent 5. In other words, the vessels are not completely filled with drying agent 5.

The open end 15 of the regeneration conduit 13 is situated in this empty space 17. This will allow the regeneration gas to be easily split off from the vessel 4a that is drying compressed gas and also ensure an optimum distribution of the regeneration gas through the drying agent 5 of the vessel 4b that is being regenerated.

The creation of a free space 17 in the vessels 4a, 4b can be done in different ways.

In the example shown, where the drying agent 5 comprises granules, this is achieved by means of a sieve 18 or grid arranged in the vessel 4a, 4b, all of the drying agent 5 being located on one side of the sieve 18.

The openings in the sieve 18 are smaller than the granules, such that gas can pass through the sieve 18 but the grains cannot, and the sieve 18 extends over the entire cross-section of the vessel 4a, 4b.

All this results in that the granules are always all on the same side of the sieve 18 and that the other side of the sieve 18 will always be free of granules.

There is also a spring 19 which presses the sieve 18 against the granules. The screen 18 is herein movably arranged in the vessel 4a, 4b.

With the aid of the sieve 18, volume changes of the drying agent 5 can be absorbed, for instance when the drying agent 5 is saturated with moisture.

The sieve 18 will also compress the granules, such that the adsorption and regeneration will proceed efficiently because the gas will make optimal contact with the granules.

In this case, means 20 are provided for expanding the gas in a section 13b of the regeneration conduit 13 which does not extend into the vessels 4a, 4b.

These means 20 may comprise a flow restrictor or an expansion valve.

In this case, the device 1 is provided with a vent valve 21 for venting the regeneration gas after it has flowed through the vessel 4b that is being regenerated.

It is also possible that the regeneration gas is sent back to the inlet 2 of the device 1 after it has flowed through the vessel 4b that is being regenerated.

In the example shown, an intermediate block 22a, 22b is arranged between each vessel 4a, 4b and the valve system 7.

In this case, such an intermediate block 22a, 22b is arranged between the valve block 10b of the valve system 7 and each container 4a, 4b.

Each intermediate block 22a, 22b has a passage 23 for gas to be dried which connects to the inlet 8 of the respective vessel 4a, 4b and to the valve block 10b and a passage 24 for regeneration gas which connects to said opening 14 for regeneration gas in the vessels 4a, 4b.

This passage 24 for regeneration gas forms part of the regeneration conduit 13 or, alternatively, the regeneration conduit 13 passes through this passage 24 for regeneration gas.

The gas to be dried enters the vessel 4a, 4b on the same side as where the regeneration gas enters or exits the vessel 4a, 4b, such that the section 13a of the regeneration conduit 13 extending into the vessel 4a, 4b is designed as a long section to ensure that the gas to be dried has passed through the drying agent 5 and is thus dried, before it is branched off through the regeneration conduit 13.

As a result, there will be sufficient space in said section 13a of the regeneration conduit 13 to accommodate the heater 16a, 16b.

Also provided in the intermediate blocks 22a, 22b are electrical connections 25 for the heaters 16a, 16b.

The electrical connections 25 are connected to the heaters 16a, 16b, in particular to connections for power supply provided thereto, such that the heaters 16a, 16b can be supplied with the necessary power supply, in this case electricity.

In this case, but not necessarily for the invention, the heaters 16a, 16b are controlled, i.e. turned on and off, by said control unit which controls the valves 12.

Of course, it is not excluded that a separate control unit is provided specifically for the heaters 16a, 16b.

For regulating or controlling the heaters 16a, 16b, said control unit may be connected to the heaters 16a, 16b themselves, or to said electrical connections 25.

Finally, in this case, the sections 13a of the regeneration conduit 13 extending into the vessels 4a, 4b are provided on the outside with fins 26 extending into the drying agent 5.

In this case, these fins 26 are radially oriented and extend in the axial direction over a section of the regeneration conduit 13.

The fins 26 ensure that the heat generated by the heater 16a, 16b can be optimally distributed in the vessel.

The operation of the device 1 is very simple and as follows.

Compressed gas to be dried, originating from a compressor, will enter the device 1 through the inlet 2.

It will be directed to the vessels 4a, 4b through the valve block 10b.

Hereby, the valves 12 in the block 10b are controlled such that the gas can only end up in the container 4a that dries.

During the passage in this vessel 4a, the gas comes into close contact with the drying agent 5, whereby the moisture present in this gas will be absorbed or adsorbed by the drying agent 5.

The dried compressed gas will leave the vessel 4a and will flow through the conduits 11 and valves 12 of the block 10a to the outlet 3 to be discharged, for example, to a consumer network not shown in the figures.

At the same time with the drying process that takes place in said vessel 4a, there will also be a vessel 4b that is being regenerated, which vessel 4b will contain a saturated or nearly saturated drying agent 5. This vessel will previously have dried gas.

To regenerate this vessel 4b, use is made of a regeneration gas, which gas, in this case, is branched off by means of the regeneration conduit 13.

This regeneration conduit 13 will branch off a portion of the dried compressed gas from the vessel 4a that is drying.

Due to the location of the open end 15 of the regeneration conduit 13 in said open space 17, the dried compressed gas can only be branched off after the compressed gas has passed through the drying agent 5.

The regeneration conduit 13 will direct the split-off regeneration gas to the vessel 4b that is being regenerated.

The heater 16b in the vessel 4b will be turned on, such that the split-off regeneration gas is heated in the section 13a of the regeneration conduit 13 extending into the vessel 4b.

Note that the heater 16a in the vessel 4a is turned off.

Because the vessel 4b is insulated, the heat generated by the heater 16b will not or hardly be able to escape from the vessel 4b. In other words, no losses will occur, such that the other vessel 4a is not unintentionally heated and such that the heater does not have to be set higher to compensate these losses.

The gas thus heated enters the vessel 4b, will flow through this vessel 4b and will regenerate the drying agent 5 by discharging the adsorbed or absorbed moisture.

After its passage through the vessel 4b, the gas is sent through the valve block 10b toward the vent valve 21 to be vented.

After regenerating the vessel 4b, the regenerated drying agent 5 will have a relatively high temperature.

Since a cold drying agent 5 can dry better than a warm drying agent 5, it is better for the efficiency of the device 1 to cool the drying agent 5 first before using the respective vessel 4b again for drying.

Preferably, the vessels 4a, 4b are therefore cooled before or after they are regenerated whereby by controlling the valve system 7 each vessel 4a, 4b successively either:
dries, is regenerated and is cooled; or
dries, is cooled and is regenerated;
wherein the valve system 7 is such that always one vessel 4a, 4b dries the compressed gas.

The cooling will be done in the same way as the regeneration, but whereby said heater 16b in the container 4b is switched off.

The split-off dried compressed gas from the vessel 4a is now not heated but used as a cooling gas to cool the vessel 4b.

The split-off gas will flow through this vessel 4b, wherein this gas will cool the drying agent 5. After passing through the vessel 4b, the gas is also vented.

When the vessel 4b is cooled, and when the vessel 4a is saturated with moisture, it will be necessary to regenerate this vessel 4a.

By switching the valves 2, it can be ensured that regeneration gas is supplied to this vessel 4a, allowing the regeneration to take place according to the process described above and that the compressed gas to be dried is transferred to the now regenerated and cooled vessel 4b, in order to dry this gas.

The switching cycle described above will be continuously repeated such that each vessel 4a, 4b will successively dry, then be regenerated and subsequently be cooled after which it can be used again for drying gas.

It is important to note that the control of the valves 12 can be adapted as a function of the operating parameters and/or the load factor of the device 1 in order to optimize the process. For example, based on the humidity of the compressed gas leaving the compressor.

It is clear that this control can take place automatically, for example by providing the necessary sensors and controllers.

Although the vessels 4a, 4b, as described above, are cooled after the regeneration, it is not excluded that the vessels are first cooled before being regenerated.

FIG. 2 shows a variant according to FIG. 1, wherein in this case four vessels 4a, 4b, 4c, 4d are present. These are grouped in pairs and connected like vessels 4a, 4b in FIG. 1.

The first two vessels 4a, 4b are connected in parallel with the other two vessels 4c, 4d.

In this figure, also a compressor 27 is shown having an inlet 28 and an outlet 29 and a pressure line 30 connected to the outlet 29, which leads to the inlet 2 of the device 1.

The operation is very analogous to the one in FIG. 1, in which two vessels 4a, 4c will now always dry, while the other two vessels 4b, 4d are regenerated or cooled.

The present invention is by no means limited to the embodiments described by way of example and shown in the figures, but a device and method according to the invention for drying compressed gas and a compressor installation provided with such a device may be realized in all kinds of variants without departing from the scope of the invention.

The invention claimed is:

1. A device for drying compressed gas, comprising an inlet for compressed gas to be dried and an outlet for dried compressed gas, which device comprises at least two vessels with arranged therein a regenerable drying agent and a controllable valve system connecting said inlet and outlet to an inlet and outlet of said vessels, wherein said valve system is such that always at least one vessel is being regenerated while the other vessels dry the compressed gas, wherein by controlling the valve system, the vessels are each in turn successively regenerated, wherein the device is provided with a regeneration conduit splitting off a portion of the dried compressed gas as a regeneration gas and feeding it into the at least one vessel that is being regenerated, for the regeneration of said at least one vessel that is being regenerated, wherein the regeneration conduit at least partly extends through an opening provided thereto in the vessels for regeneration gas into the vessels such that the regeneration gas can be split off from the vessel that dries the compressed gas before the dried gas leaves the vessel via the vessel outlet, and in that in the vessels, a heater is provided situated in the regeneration conduit for heating the regeneration gas before the regeneration gas is fed through the drying agent into the vessel that is being regenerated.

2. The device according to claim 1, wherein between each vessel and the valve system, an intermediate block is provided with a passage for gas to be dried connecting to the inlet of the respective vessel and to the valve block, and a passage for regeneration gas connecting to said opening for regeneration gas in the vessels, which passage for regeneration gas is part of the regeneration conduit.

3. The device according to claim 2, wherein electrical connections for the heater are provided in the intermediate blocks.

4. The device according to claim 1, wherein the vessels at one of their ends, an empty space is provided which is free of drying agent, wherein the open end of the regeneration conduit is situated in this empty space.

5. The device according to claim 1, wherein a means for expanding the gas are provided in a section of the regeneration conduit which does not extend into the vessels.

6. The device according to claim 1, wherein the device is provided with a release valve for releasing the regeneration gas, after it has passed through the vessel that is being regenerated.

7. The device according to claim 1, wherein the vessels are covered all round on their outside and/or on their inside with an insulating material.

8. The device according to claim 1, wherein an insulating material is provided between the vessels and the valve system.

9. The device according to claim 1, wherein the vessels are double-walled, wherein insulating material is arranged between the walls of the vessels.

10. The device according to claim 1, wherein the vessels on their outside and/or inside are coated with an insulating coating.

11. The device according to claim 1, wherein the sections of the regeneration conduit extending into the vessels are at least provided at least partly on the outside with fins extending into the drying agent.

12. The device according to claim 1, wherein the vessels are formed by extruded profiles.

13. The device according to claim 1, wherein the regenerable drying agent takes the form of granules of silica gel, activated alumina, or molecular sieve material, or that the drying agent has a solid form, comprising a solid support of ceramic material, of paper, of glass fibre or of wire mesh, or a combination thereof.

14. A compressor installation provided with a compressor having an inlet for gas to be compressed and an outlet with a pressure conduit for compressed gas, wherein the compressor installation comprises a device according to claim 1, for drying the flow of compressed gas supplied by the compressor which is passed through the device for supplying dried gas to a consumer network through the outlet of the device, the pressure conduit thereto connecting to the inlet of the device.

15. A method for drying compressed gas, using a device according to claim 1, wherein the method comprises a step of:

passing compressed gas to be dried through a vessel and regenerating the other vessel, wherein the method further comprises each in turn successively;

regenerating the vessels, wherein the method further comprises a step of splitting off a portion of the dried compressed gas, and directing this split-off gas to the vessel that is being regenerated, wherein the method further comprises a step of;

splitting off the dried compressed gas in the vessel drying itself before it leaves the vessel via an outlet for dried compressed gas, and a step of;

heating this gas in the vessel regenerating itself using a heater arranged in the vessel.

16. The method according to claim 15, wherein the method further comprises a step of cooling the vessels before or after they are being regenerated, wherein each vessel, successively either:

dries, is regenerated and is cooled; or dries, is cooled and is regenerated;

and wherein the method is such that always one vessel dries the compressed gas.

* * * * *